(12) United States Patent
Zhou

(10) Patent No.: US 7,841,525 B1
(45) Date of Patent: Nov. 30, 2010

(54) DIGITAL TICKETING SYSTEM AND METHOD

(75) Inventor: Tong Zhou, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1195 days.

(21) Appl. No.: 11/438,194

(22) Filed: May 22, 2006

(51) Int. Cl.
*G06F 19/00* (2006.01)
*G06K 5/00* (2006.01)

(52) U.S. Cl. ........................ 235/385; 235/382
(58) Field of Classification Search .............. 235/358, 235/380, 382, 382.5, 492, 493, 375, 385
See application file for complete search history.

(56) References Cited

U.S. PATENT DOCUMENTS

| | | | | |
|---|---|---|---|---|
| 5,136,647 A | * | 8/1992 | Haber et al. | 713/178 |
| 6,023,509 A | * | 2/2000 | Herbert et al. | 705/76 |
| 6,079,018 A | * | 6/2000 | Hardy et al. | 713/170 |
| 6,199,053 B1 | * | 3/2001 | Herbert et al. | 705/76 |
| 7,162,639 B1 | * | 1/2007 | Bleumer | 713/180 |
| 2007/0106908 A1 | * | 5/2007 | Miyazaki et al. | 713/189 |

OTHER PUBLICATIONS

Chakravorty et al., "MoB: A Mobile Bazaar for Wide-area Wireless Services," pp. 228-242.

* cited by examiner

*Primary Examiner*—Thien M Le

(57) ABSTRACT

In a digital ticketing system, tickets are created in groups. All the digital tickets in a group share a common signature value, but each ticket in the group has a unique seed value, which may be a random number. The common signature value is derived from hashing all the seed values in the group and then digitally signing a combination of the hash values. In one example, the hash values are concatenated and encrypted with a private key to generate the common signature value. The system may be implemented and tickets exchanged using mobile devices, such as mobile telephones.

20 Claims, 2 Drawing Sheets

DIGITAL TICKETING SYSTEM AND METHOD

BACKGROUND

This invention relates to a ticketing system. In particular, the invention relates to methods for generating and authenticating digital tickets.

As mobile devices such as cell phones become ubiquitous, they have been called upon to perform more and more computing tasks, from playing games and music to browsing the Web. As the transactions conducted with mobile devices become more important, higher value transactions, it is increasingly important that the mobile devices be capable of implementing algorithms for conducting secure transactions. Such algorithms however, such as the use of public/private key encryption and signature systems, tend to place high demands on processing power, which is a particularly limited resource in mobile devices.

It is desirable to implement a system of conducting certain transactions in a relatively secure fashion, while limiting the demands placed on the processor of a mobile device.

SUMMARY OF THE INVENTION

In a digital ticketing system, tickets are created in one or more groups of at least two tickets. The digital tickets in a group share a common digital signature value. Each ticket in the group is also provided with seed value, which may be unique to the ticket. The common signature value is derived from hashing all the seed values in the group and digitally signing a combination of the hash values. In one example, the hash values are concatenated and encrypted with a private key to generate the common signature value. The system may be implemented and tickets exchanged using mobile devices, such as mobile telephones.

In some embodiments, the digital ticketing system operates without imposing excessive demands on either server-side processing resources or on client device processing resources. Preferably, multiple individuals with tickets cannot conspire to duplicate the ticket of another, non-collaborating individual.

DETAILED DESCRIPTION

I. Overview of One Exemplary Embodiment

Figure 1:
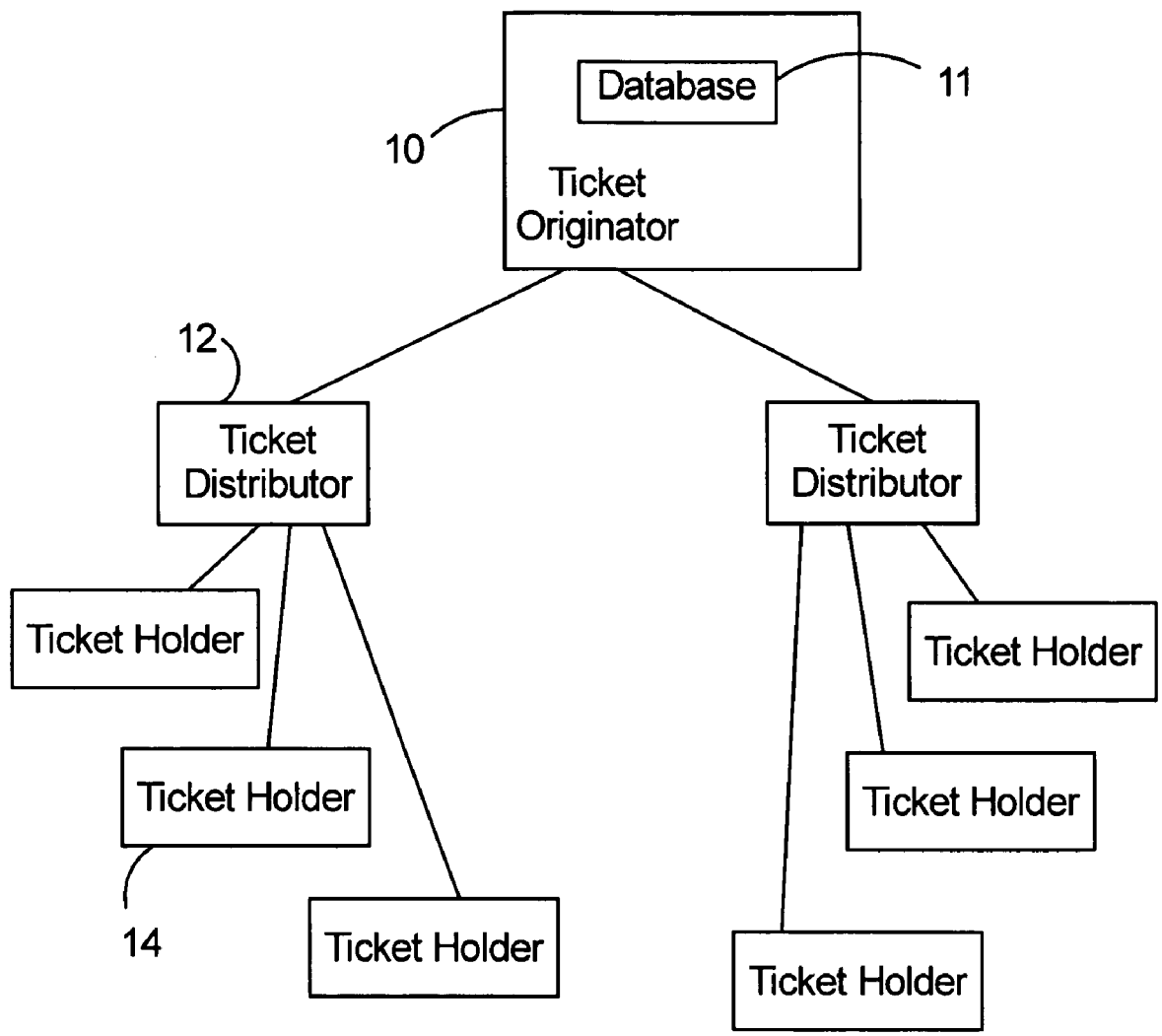
FIG. 1 is a schematic block diagram of the system architecture of a digital ticketing system.

In one embodiment, a method is provided for distributing digital tickets. A ticket originator generates one seed value for each ticket to be generated. These seed values could be random numbers. If n tickets are to be generated, each seed value can be identified by the notation $S_i$, where i ranges from 1 to n. A hash function is then applied to each of the seed values to generate respective hash values $H(s_i)$, or $H_i$.

All n of the hash values $H_n$ are then combined together in a predetermined way, such as by concatenation. The function that combines the hash values is referred to here as $C(H_1, H_2 \ldots H_n)$. The function C may itself make use of a hash function.

The combination of hash values $C(H_1, H_2 \ldots H_n)$ is then encrypted with a private encryption key. The result of the private encryption is a signature value V. Decrypting the value V with the corresponding public key, then, would result in the value $C(H_1, H_2 \ldots H_n)$.

The digital tickets that are distributed to recipients in this embodiment include one of the seed values, the hash values that correspond to the remaining seed values, and the signature value. Where, for example, there are three tickets, the first ticket includes the following values:

$S_i$, $H_2$, $H_3$, V;

the second ticket includes the following values:

$H_1$, $H_2$, $H_3$, V;

and the third ticket includes the following values:

$H_1$, $H_2$, $s_3$, V.

In brief, all tickets in this embodiment include the same signature value V, and the $i^{th}$ ticket includes the value $s_i$ and the values $H_j$ for all $j \neq i$ and $1 \leq j \leq n$.

The hash function H and the combining function C are made known to the ticket holders. In this way, each ticket holder can determine whether he has a valid ticket by hashing the remaining un-hashed seed value, combining the hash values, and decrypting the value V. For a valid ticket, the result of decrypting V should be the same as the combination of hash values. For example, the second ticket holder has the following information:

$H_1$, $s_2$, $H_3$, V;

To check the validity of his ticket, he applies the hash function to $s_2$ to obtain the following:

$H_1$, $H_2$, $H_3$, which he combines with the function C to obtain $C(H_1, H_2 \ldots H_n)$.

If this value matches the result of decrypting value V with the public key, then the second ticket holder has a valid ticket.

The hash function H is chosen such that it cannot feasibly be inverted to recover the values $s_i$ from the values $H_i$. As a consequence, each ticket holder cannot feasibly use his own ticket to generate the ticket of another. Likewise a group of ticket holders cannot combine the information in their tickets to reconstruct the ticket of another ticket holder (who is not part of that group), because only that other ticket holder knows his corresponding seed value $s_i$.

In this embodiment, only one signature value V is calculated for the group of n tickets. Thus, it is not necessary to sign digitally all n tickets, which could require a prohibitive amount of processor resources.

II. A Digital Ticketing System

In one embodiment, a digital ticketing system includes a ticket originator 10, one or more ticket distributors, and one or more ticket holders 14 (FIG. 1). The ticket originator may be associated, with, for example, a box office for a film, sporting event, amusement park, or other paid attraction. To originate a plurality of tickets, the ticket originator generates a seed value corresponding to each ticket. The originator may store the seed value in a database of valid seed values.

In an embodiment in which the ticket originator stores valid seed values in a database 11, other information may be stored together with the seed values. For example, each seed value may be associated in the database with the identification of a distributor through which the digital ticket is to be distributed, and/or the identification of a ticket holder who is to receive the digital ticket. The database may identify the event name, time, and/or date for which the ticket is good, or a seat number and/or zone for which the ticket is good. The database may provide other information, such as whether the ticket is transferable, or whether it is good for multiple entries.

The ticket originator receives from a ticket distributor a request for a group of a specified number n of tickets. The ticket originator then generates the group of n tickets using n of the seed values. (The seed values may have been generated in advance, or they may be generated only in response to a request for tickets.)

The tickets that are ultimately provided to the ticket holders are provided with a common signature value V. Where $s_i$ represents the seed values, and $H_i$ represents the hashes of the respective seed values, V is a digital signature value generated from a combination of the hash values $H_1 \ldots H_n$. In one embodiment, in which, for example, the group consists of eight tickets, the tickets include the following information:

Ticket 1: $S_1, H_2, H_3, H_4, H_5, H_6, H_7, H_8, V$
Ticket 2: $H_1, s_2, H_3, H_4, H_5, H_6, H_7, H_8, V$
Ticket 3: $H_1, H_2, s_3, H_4, H_5, H_6, H_7, H_8, V$
Ticket 4: $H_1, H_2, H_3, s_4, H_5, H_6, H_7, H_8, V$
Ticket 5: $H_1, H_2, H_3, H_4, s_5, H_6, H_7, H_8, V$
Ticket 6: $H_1, H_2, H_3, H_4, H_5, s_6, H_7, H_8, V$
Ticket 7: $H_1, H_2, H_3, H_4, H_5, H_6, s_7, H_8, V$
Ticket 8: $H_1, H_2, H_3, H_4, H_5, H_6, H_7, s_8, V$ In one embodiment, the digital signature value V is the result of applying the ticket originator's private key to a combination of all of the hash values $H_1 \ldots H_n$. In an alternative embodiment, the digital signature value V is the result of applying the private key of a ticket distributor to a combination of all of the hash values $H_1 \ldots H_n$. The hash values may be combined by concatenation or in another way.

The hash values may be generated by any one or more of a variety of hash functions, such as MD5, SHA-1, SHA-2, or others. The digital signature may be created with, for example, the RSA algorithm, as specified in, for example, ANSI X9.31, an algorithm using elliptic curve factorization, such as Elliptic Curve DSA (ECDSA) as specified in ANSI X9.62, or by other means.

Additional information may be used in the creation of the digital signature value V, but, preferably, the generation of V does not require direct knowledge of any of the values $s_i$ themselves. The information used to generate V is preferably available to all members of a group of ticket holders.

The ticket originator provides either the seed values or the completed digital tickets to one or more ticket distributors. The ticket distributor may be associated directly with the ticket originator, as if they are both affiliated with a single box office. A ticket distributor may alternatively be an independently-operated for-profit distributor, such as a ticket broker. The distributor may, for example, be a tour operator, who distributes tickets to a tour group. The distributor may himself be a ticket holder.

In a case in which the distributor receives only seed numbers from the originator, the distributor generates the tickets before providing them to the ticket holders.

Each ticket holder i can confirm that he has a valid ticket by hashing the seed value $s_i$ in his ticket, combining the resulting hash value $H_i$ with the remaining hash values, decrypting the signature value V (with the public key of the originator or distributor, as appropriate), and comparing the decrypted V to the combination of hash values. The two should match in the case of a valid ticket. In the case of a group of cooperating ticket holders, the ticket holders can exchange information as to the hash values in their tickets, while keeping their seed values confidential from one another. If two ticket holders in the same group have different values of $H_i$ for some choice of i, then one or more of the tickets is invalid. Similarly, the cooperating ticket holders can identify which seed value they have in un-hashed form, without sharing the seed value itself. If two or more ticket holders have the same seed value in un-hashed form, then one or more of those tickets is invalid.

The ticket may be redeemed by a separate ticket redeemer, by the ticket originator, or by the ticket distributor. The ticket redeemer may authenticate the validity of the ticket being redeemed in one or more of a variety of ways, depending on the level of authentication needed and the time, processor, and communication resources available.

In one process of authenticating the presented ticket, the redeemer checks the seed value $s_i$ against values stored in the database of the ticket originator. An indication may be placed in the database that the ticket has been redeemed, so that a ticket with seed value $s_i$ cannot be used more than once. In authentication process, the redeemer hashes the seed value $s_i$ in the presented ticket, combines the resulting hash value $H_i$ with the remaining hash values, decrypts the signature value V, and compares the decrypted V to the combination of hash values. The two should match in the case of a valid ticket. In another authentication process, the redeemer has access to one or more seed values $s_j$ in addition to the seed value $s_i$ that is provided in the ticket. In this way, the redeemer can check the hash values $H_j$ in the digital ticket. Any or all of these authentication steps may be performed when the ticket is redeemed.

The data used in the digital ticket may be recorded in any one or more of a variety of ways. For example, the digital ticket may be held by the ticket holder in built-in RAM (random access memory) of a mobile or other device, it may be recorded (temporarily or permanently) on a fixed or removable magnetic, electrostatic, paper, plastic, or other medium. For example, the data used in the digital ticket may be recorded on a medium such as a USB (universal serial bus) drive, a memory stick, a SIM (subscriber identity module) card, or RFID (radio frequency identification) tag. The ticket may be printed in visible, magnetic, and/or other ink on a substrate as, for example, text, or as a 2-dimensional bar code.

III. A Digital Ticketing Method

A. Providing Digital Tickets

Figure 2A:
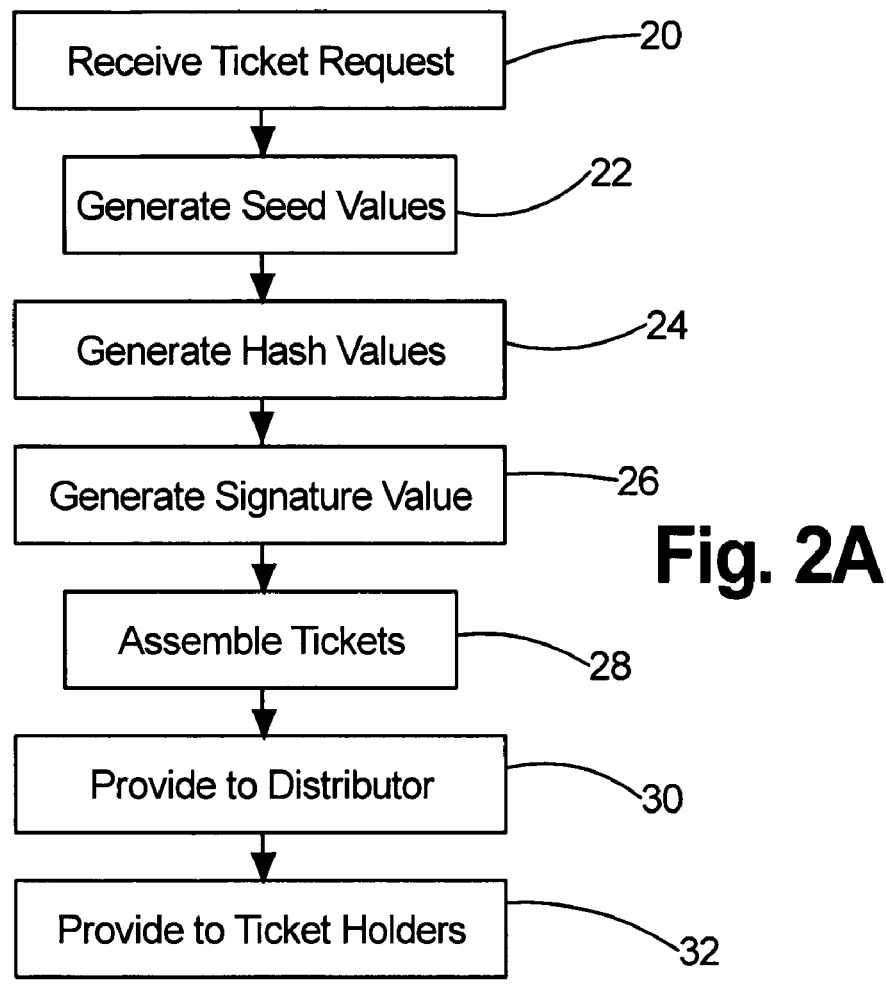
FIG. 2A is a flow diagram illustrating steps in the generation and distribution of digital tickets.

In a digital ticketing method (FIG. 2A), a ticket originator receives a request for a group of n digital tickets (step 20). The originator generates n different seed values $s_i$ (step 22), with each value corresponding to a ticket to be generated. The seed value may be, for example, a random number. If the seed value is generated randomly, the ticket originator may perform a check (not illustrated) to ensure that seed values are not duplicated among different tickets.

In step 24, the ticket originator hashes the seed values $s_i$ to generate the corresponding hash values $H_i$, and in step 26, the originator determines the signature value V. To determine the signature value, the originator first combines all the hash values $H_i$ using a predefined function $C(H_1, H_2 \ldots H_n)$. The function C may be a concatenation of the values $H_i$, a bitwise XOR of the values $H_i$, a hash of the combination of the values $H_i$, or some other function of the values $H_i$. Preferably, C is chosen such that using an incorrect value of $H_i$ is highly unlikely to result in a correct value of the combination $C(H_1, H_2 \ldots H_n)$. The value V is, in a preferred embodiment, the result of the application of a cryptographic private key to the combination $C(H_1, H_2 \ldots H_n)$. The cryptographic key may be applied to data that includes the combination $C(H_1, H_2 \ldots H_n)$ as well as other information, such as information relating to the digital signature itself (e.g., identifying the signing and/or certifying authorities), information relating to event or attraction to which the tickets relate, time and date information, or other information. The method of generating the signature value is preferably chosen such that a valid signature is very unlikely to have been generated without access to private information, such as a private encryption key, and such that the signature can be validated with access to public information, such as a public encryption key.

In step 28, the ticket originator assembles the tickets in for group. As described in sections I, and II, above, the digital ticket for the $i^{th}$ member of the group includes the un-hashed seed value $s_i$, the hash values $H_j$ for the remaining values of $j \neq i$, and the signature value V. In step 30, the ticket originator provides the group of tickets to the distributor. The tickets may be provided to the distributor via a wireless telecommunications network, such as a CDMA network. In this way, a distributor can receive digital tickets from a ticket originator located a significant distance away. The distributor may be, for example, a mobile device, such as a mobile telephone. In step 32, the distributor provides the tickets to individual ticket holders. In one embodiment, the ticket holders are Bluetooth-equipped mobile devices, and the distributor provides the tickets to the ticket holders over a Bluetooth wireless connection.

In an alternative embodiment, to reduce the quantity of data sent to the distributor, the originator may send only the values $s_1 \ldots s_n$ and the signature value V to the distributor. The distributor may calculate hash values as necessary and assemble the tickets for the individual ticket holders. In another embodiment, the originator provides the distributor only with the values $s_1 \ldots s_n$, and the distributor generates both the hash values and the signature value V. In this last case, the signature value V may be generated with a private key of the distributor. The public key of the distributor may itself be signed by the ticket originator and/or by a certifying authority.

B. Authenticating Digital Tickets

Figure 2B:
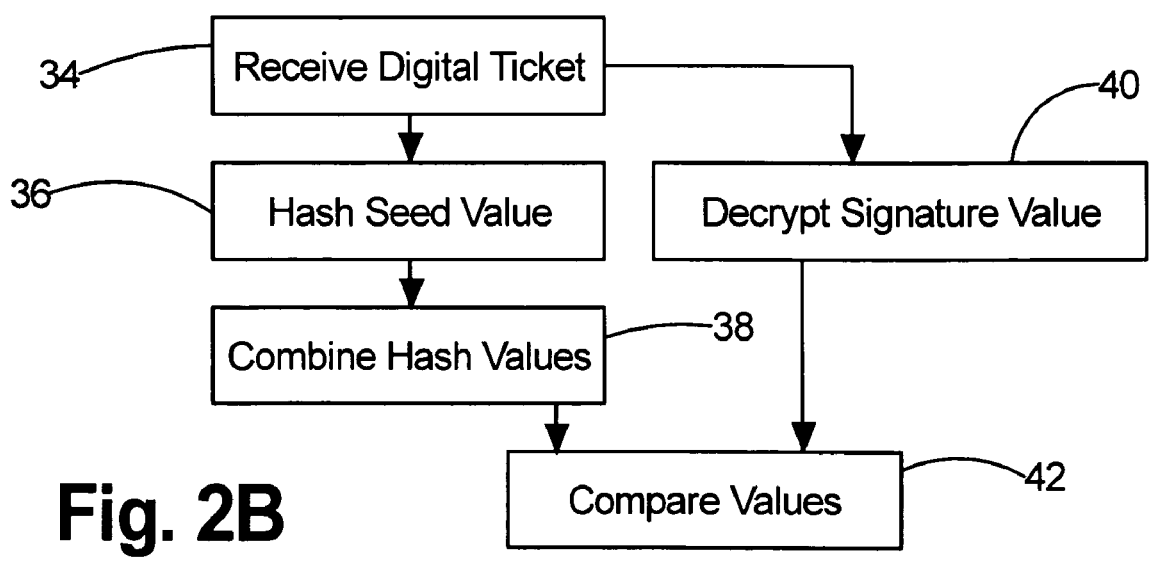
FIG. 2B is a flow diagram illustrating the authentication of a digital ticket.

A ticket holder receives a ticket in step 34 (FIG. 2B). To verify the authenticity of the ticket, the ticket holder hashes the seed value $s_i$ (step 36) and combines the resulting hash value $H_i$ with the remaining hash values in the ticket (step 38). Where public-key cryptography was used to generate the signature value V, the ticket holder verifies the signature by decrypting the signature value V with the appropriate public key (step 40) and comparing the result to the combination of hash values (step 42). If the values match, the ticket holder determines that it has a valid ticket. In a further step (not shown), the ticket holder may check whether the public key used to decrypt the signature value V has itself been signed by the ticket originator and/or by a certifying authority.

Although this authentication process is described as being performed by a ticket holder, the same process may be performed by a ticket redeemer, for example at the entrance to a paid attraction.

IV. Other Embodiments

In one alternative embodiment, the function C that combines the hash values $H_j$ makes use of a commutative binary operator, such as addition, multiplication, or a bitwise XOR operation. In such an embodiment, each ticket holder need not be provided with all the hash values $H_j$ individually, but rather may be supplied with an incomplete combination: the result of applying C to the values $H_j$ (for $j \neq i$). Then, to obtain the final combination of hash values $C(H_1, H_2 \ldots H_n)$, a ticket holder applies the operator to $H_i$ and the incomplete combination.

For example, in a group of three tickets, each ticket holder may be provided with the following information:

Ticket 1: $s_1$, $C(H_2, H_3)$, V

Ticket 2: $s_2$, $C(H_1, H_3)$, V

Ticket 3: $s_3$, $C(H_1, H_2)$, V

In one example of such an embodiment, the function C performs a bitwise XOR operation on its arguments (designated herein with the caret, "^"). V is a signature generated using $C(H_1, H_2, H_3)$, which is equal in this example to $H_1 \verb|^| H_2 \verb|^| H_3$. Any ticket holder can generate the proper value of $C(H_1, H_2, H_3)$ by generating a hash of its own seed value and performing a bitwise XOR of that hash and the incomplete combination. For example, ticket holder 2 generates $C(H_1, H_2, H_3)$ by calculating $H(s_2) \verb|^| C(H_1, H_3)$.

In another alternative embodiment, the signature value V is an encrypted version of a plurality of hash values $H_i$, and the tickets do not include clear-text versions of the hash values $H_j$. In such an embodiment, tickets may include the following information:

Ticket 1: $S_1$, V

Ticket 2: $s_2$, V

Ticket 3: $s_3$, V

A ticket holder or redeemer authenticates such a ticket by hashing the seed value $s_i$, to generate $H_i$ and decrypting V with a public key. If the value K is found in the decrypted version of V, the ticket is considered to be valid. As in other embodiments, processing power is conserved by re-using the same digital signature value V for more than one ticket. Still, because the values of $s_i$ are not present in the decrypted V, ticket holders cannot feasibly duplicate the ticket of a different, non-cooperating ticket holder.

The roles of ticket originator, distributor, and ticket holder can be distributed among a variety of different devices or systems, or some of the roles can be consolidated into a single device or system. For example, in one embodiment, the ticket originator is a computer server associated with an attraction, such as a historical monument, the distributor is a personal computer associated with a tour agency, and the ticket holders are mobile telephones of individuals in a tour group. Alternatively, the ticket originator and distributor are implemented on a single mobile telephone, and the ticket holders themselves are mobile telephones. Tickets may be distributed over a telecommunications network, by a short-range wireless protocol such as Bluetooth, or by other means.

After the initial transfer from a distributor to a ticket holder, digital tickets may be further transferred to other prospective ticket holders.

The examples provided herein describe each ticket as including a single un-hashed seed value. In other embodiments, tickets may be provided with more than one seed value in un-hashed form. The seed values that are un-hashed may overlap among different ticket holders. This may optionally be done in such a way that a pre-selected group of ticket holders can combine the information from their respective tickets to recreate the ticket of a non-cooperating ticket holder.

Though the examples provided herein set forth particular embodiments, the invention is not limited to those embodiments but rather is defined by the following claims.

The invention claimed is:

1. A digital ticketing method comprising:
   generating at least two seed values;
   generating a hash value from each seed value;
   digitally signing a combination of the hash values to create a signature value;
   generating at least two tickets, wherein each ticket includes a seed value and the signature value; and
   generating a combination of the hash values, wherein the combination of the hash values is a concatenation of the n corresponding hash values.

2. The digital ticketing method of claim 1, further comprising a mobile device holding at least one of the at least two tickets in random access memory (RAM) of the mobile device.

3. The digital ticketing method of claim 1, further comprising recording at least one of the at least two tickets in a medium selected from the group consisting of a magnetic medium, an electrostatic medium, a paper medium, and a plastic medium.

4. The digital ticketing method of claim 1, wherein a ticket originator generates the at least two tickets, the method further comprising:
   the ticket originator providing the at least two tickets to a ticket distributor via a wireless telecommunications network; and
   the ticket distributor providing the at least two tickets to ticket holders.

5. The digital ticketing method of claim 4, wherein the ticket originator comprises a computer server associated with a paid attraction.

6. The digital ticketing method of claim 4, wherein the ticket holders are Bluetooth-equipped mobile devices, and wherein the ticket distributor provides the tickets to the ticket holders over a Bluetooth wireless connection.

7. The digital ticketing method of claim 1, further comprising authenticating at least one of the at least two tickets.

8. The digital ticketing method of claim 7, wherein authenticating at least one of the at least two tickets is performed by at least one of a ticket holder and a ticket redeemer.

9. The digital ticketing method of claim 8, wherein the ticket holder is a mobile telephone.

10. The digital ticketing method of claim 8, wherein the ticket redeemer is located at entrance to a paid attraction.

11. A digital ticketing method comprising:
    generating at least two seed values;
    generating a hash value from each seed value;
    digitally signing a combination of the hash values to create a signature value;
    generating at least two tickets, wherein each ticket includes a seed value and the signature value,
    wherein generating at least two seed values comprises generating n seed values, with each seed value corresponding to a ticket;
    wherein generating a hash value comprises generating n corresponding hash values;
    wherein digitally signing a combination of the hash values includes digitally signing a combination of the n hash values; and
    wherein generating at least two tickets comprises generating n tickets, wherein each ticket includes the corresponding seed value, the hash values that do not correspond to the seed value, and the signature value.

12. The digital ticketing method of claim 11, further comprising generating a combination of the hash values, wherein the combination of the hash values is a concatenation of the n corresponding hash values.

13. The digital ticketing method of claim 11, further comprising recording at least one of the at least two tickets in a medium selected from the group consisting of a magnetic medium, an electrostatic medium, a paper medium, and a plastic medium.

14. The digital ticketing method of claim 11, wherein a ticket originator generates the at least two tickets, the method further comprising:
    the ticket originator providing the at least two tickets to a ticket distributor via a wireless telecommunications network; and
    the ticket distributor providing the at least two tickets to ticket holders.

15. A digital ticketing method comprising:
    generating at least two seed values;
    generating a hash value from each seed value;
    digitally signing a combination of the hash values to create a signature value; and
    generating at least two tickets, wherein each ticket includes a seed value and the signature value;
    wherein the information included in each digital ticket is such that no one digital ticket can be reconstructed from information in the remaining digital tickets.

16. The digital ticketing method of claim 15, wherein each ticket includes no more than one seed value.

17. The digital ticketing method of claim 15, wherein the seed value is a random number.

18. The digital ticketing method of claim 15, further comprising recording at least one of the at least two tickets in a medium selected from the group consisting of a magnetic medium, an electrostatic medium, a paper medium, and a plastic medium.

19. The digital ticketing method of claim 15, wherein a ticket originator generates the at least two tickets, the method further comprising:
    the ticket originator providing the at least two tickets to a ticket distributor via a wireless telecommunications network; and
    the ticket distributor providing the at least two tickets to ticket holders.

20. A digital ticketing method comprising:
    generating at least two seed values;
    generating a hash value from each seed value;
    digitally signing a combination of the hash values to create a signature value;
    generating at least two tickets, wherein each ticket includes a seed value and the signature value, wherein the seed values are generated by a ticket originator; and,
    sending the seed values to a ticket distributor at a location remote from the ticket originator;
    wherein the ticket distributor digitally signs the combination of the hash values.

* * * * *